United States Patent
Hejazi et al.

(10) Patent No.: US 10,858,791 B2
(45) Date of Patent: Dec. 8, 2020

(54) MULTIPURPOSE VISCOUS DAMPER

(71) Applicant: UNIVERSITI PUTRA MALAYSIA, Serdang (MY)

(72) Inventors: Farzad Hejazi, Serdang (MY); Mohd Saleh Bin Jaafar, Serdang (MY); Mehdi Mohammadi, Serdang (MY)

(73) Assignee: Universiti Putra Malaysia, Serdang (MY)

( * ) Notice: Subject to any disclaimer, the term of this patent is extended or adjusted under 35 U.S.C. 154(b) by 0 days.

(21) Appl. No.: 16/388,795

(22) Filed: Apr. 18, 2019

(65) Prior Publication Data
US 2019/0323183 A1    Oct. 24, 2019

(30) Foreign Application Priority Data

Apr. 18, 2018    (MY) .......................... PI 2018701536

(51) Int. Cl.
*F16F 9/00*    (2006.01)
*E01D 19/00*    (2006.01)
(Continued)

(52) U.S. Cl.
CPC ............. *E01D 19/00* (2013.01); *B60G 13/08* (2013.01); *E04B 1/98* (2013.01); *E04H 9/02* (2013.01);
(Continued)

(58) Field of Classification Search
CPC ...... F16F 9/165; F16F 9/26; F16F 9/28; F16F 9/18; F16F 9/185; F16F 9/22; F16F 9/3235; E04H 9/0235
See application file for complete search history.

(56) References Cited

U.S. PATENT DOCUMENTS 2,838,140 A * 6/1958 Rasmusson ........... F15B 11/076
    188/313
2,917,303 A * 12/1959 Vierling ................... F16F 9/18
    267/225
(Continued)

FOREIGN PATENT DOCUMENTS

CN    105525697 A      4/2016
JP    03200417 A  *   9/1991    ........... B60G 21/026

OTHER PUBLICATIONS

English abstract for JP 03-200417.*

*Primary Examiner* — Nicholas J Lane
(74) *Attorney, Agent, or Firm* — Wayne & Ken, LLC; Tony Hom

(57) ABSTRACT

The present invention relates to a multipurpose viscous damper (100), comprising: an outer cylinder (101); a core rod (102) positioned in the outer cylinder (101); a core piston (103) positioned in the middle and surrounded the core rod (102); a plurality of bypass pipes (104) extending along the outer cylinder (101), each bypass pipe (104) being connected to the outer cylinder (101) adjacent to the two ends of the outer cylinder (101); an orifice controller (105) located on the bypass pipes (104) for providing initial adjustable damping during low to moderate vibration; and characterized by a pair of inner cylinders (106) positioned inside the two ends of the core rod (102); an inner piston (107) positioned in each inner cylinder (106); a fixed sealing (108) located at the two end of each of the inner cylinders (106); and an orifice (109) located at the two ends of the inner cylinder (106) for allowing fluid flowing from the inner cylinder (106) to the outer cylinder (101) during movement of inner piston (107).

1 Claim, 4 Drawing Sheets

(51) Int. Cl.
*F16F 9/18* (2006.01)
*E04B 1/98* (2006.01)
*E04H 9/02* (2006.01)
*B60G 13/08* (2006.01)
*F16F 9/22* (2006.01)
*F16F 9/32* (2006.01)
*F16F 9/16* (2006.01)

(52) U.S. Cl.
CPC ............... *F16F 9/165* (2013.01); *F16F 9/18* (2013.01); *F16F 9/185* (2013.01); *F16F 9/22* (2013.01); *F16F 9/3235* (2013.01); *B60G 2202/24* (2013.01); *E04H 9/0235* (2020.05); *F16F 2222/12* (2013.01)

(56) References Cited

U.S. PATENT DOCUMENTS

| | | | | |
|---|---|---|---|---|
| 4,662,486 A | * | 5/1987 | Stenberg | ................... A61F 2/64 |
| | | | | 16/56 |
| 6,837,343 B1 | * | 1/2005 | Bugaj | ................... B60G 21/073 |
| | | | | 188/304 |
| 2003/0197318 A1 | * | 10/2003 | Jones | ................ F16F 15/0275 |
| | | | | 267/140.11 |
| 2010/0170760 A1 | | 7/2010 | Marking | |
| 2017/0100978 A1 | | 4/2017 | Marking | |

* cited by examiner

MULTIPURPOSE VISCOUS DAMPER

RELATED APPLICATION

This application claims priority to, and the benefits of, the Malaysian Patent Application No. PI 2018701536 filed on Apr. 18, 2018, the content of which is incorporated in its entirety herein.

FIELD OF THE INVENTION

This invention relates to a damper, more particularly relates to a multipurpose viscous damper for dissipating vibration, preventing bridge unseating and excessive structural movement during severe vibration and catastrophic ground motion.

DESCRIPTION OF RELATED ARTS

An earthquake is caused by tectonic plates getting stuck and putting a strain on the ground. The strain becomes so great that rocks give way by breaking and sliding along fault planes. An earthquake is bringing multiple impacts such as social, economic or environment impacts wherein said impact can be destroy of settlements and causes damage to an area. Therefore, earthquakes have highlighted the seismic vulnerability of bridges due to excessive movements at expansion joints. The movement could lead to the catastrophic unseating failure if the provided seat width is inadequate. Moreover, seismic pounding is inevitable during a strong earthquake due to the limited gap size normally provided at the expansion joints. Various types of restrainers, dampers and other devices may have been proposed to limit the joint movement or to accommodate the joint movement so that the damages caused by the excessive relative displacements could be mitigated. Therefore, there is a need to have appropriate devices to mitigate the relative displacement induced damages on bridge structures during earthquake shaking.

China Patent Application No. 105525697 has disclosed a smart bypass type viscous damper adopting a laminated piezoelectric actuator for adjustment. Said smart bypass type viscous damper comprises a cylinder barrel provided with a main cylinder and an auxiliary cylinder, a piston located in the cylinder barrel and a guide rod pushing the piston to move, wherein the guide rod is fixedly connected with the piston; the cylinder barrel is filled with a viscous fluid damping material; a bypass pipeline is arranged on the cylinder barrel, two end ports of the bypass pipeline are both communicated with the main cylinder, and the communicated positions are located on two sides of the piston respectively; the bypass pipeline is provided with an adjusting part, the laminated piezoelectric actuator is mounted at the adjusting part, and the adjusting part adjusts the circulating pipe diameter of the bypass pipeline under the actuation of the laminated piezoelectric actuator. The time lag effect can be reduced and output force is improved with the adoption of the smart bypass type viscous damper, wherein the requirement for seismic control of civil engineering under the earthquake action is met. The smart bypass type viscous damper may be suitable for strong randomness of ground motion such as moderate earthquakes or large earthquakes. The response speed can fully keep up with ground motion and increase the output force. However, the smart bypass viscous damper which functioning based on the velocity may cause bridge spans unseating during ground movement or any applied dynamic loads.

United States Patent Application No. 20170100978 A1 has disclosed a vehicle suspension damper includes a cylinder and a piston assembly, wherein the piston assembly includes a piston; a working fluid within the cylinder; a bypass cylinder surrounding the cylinder and defining a cylindrical bypass channel; an adjustable bypass port fluidly coupling an interior of the cylinder and the cylindrical bypass channel; and a remotely operable bypass valve slidably disposed within the cylindrical bypass channel, the remotely operably bypass valve configured for, upon actuation of an actuator coupled with the remotely operable bypass valve, adjusting a flow of the working fluid through adjustable bypass port. However, said vehicle suspension damper may not be able to withstand a severe vibration or catastrophic vibration.

United States Patent Application No. 20100170760 A1 has disclosed a damper assembly with a bypass for a vehicle wherein comprises a pressure cylinder with a piston and piston rod for limiting the flow rate of damping fluid as it passes from a first to a second side of said piston. A bypass provides fluid pathway between the first and second sides of the piston separately from the flow rate limitation. In one aspect, the bypass is remotely controllable from a passenger compartment of the vehicle. In another aspect, the bypass is remotely controllable based upon one or more variable parameters associated with the vehicle. However, said damper may not be able to withstand a severe vibration or catastrophic vibration.

None of the prior arts presents the features as in the teaching of the present invention. Accordingly, it can be seen in the prior arts that there is a need to provide a viscous damper for preventing bridge unseating and excessive structural movement in severe vibration or catastrophic vibration.

SUMMARY OF INVENTION

It is an objective of the present invention to provide a viscous damper with high flexibility for moderate movements, generate high damping and stopping force to prevent any pounding between bridge span and pier.

It is also an objective of the present invention to provide a viscous damper with high damping during severe vibration to prevent unseating of bridge span.

It is yet an objective of the present invention to provide a viscous damper to protect the structure against displacement beyond allowable movements.

Accordingly, these objectives may be achieved by following the teachings of the present invention. The present invention relates to a multipurpose viscous damper, comprising: an outer cylinder; a core rod positioned in the outer cylinder; a core piston positioned in the middle and surrounded the core rod; a plurality of bypass pipes extending along the outer cylinder, each bypass pipe being connected to the outer cylinder adjacent to the two ends of the outer cylinder; an orifice controller located on the bypass pipes for providing initial adjustable damping during low to moderate vibration; and characterized by a pair of inner cylinders positioned inside the two ends of the core rod; an inner piston positioned in each inner cylinder; a fixed sealing located at the both end of each of the inner cylinders; and an orifice located at the two ends of the inner cylinder for allowing fluid flowing from the inner cylinder to the outer cylinder during movement of inner piston.

BRIEF DESCRIPTION OF THE DRAWINGS

The features of the invention will be more readily understood and appreciated from the following detailed descrip

DETAILED DESCRIPTION OF THE INVENTION

Figure 1:
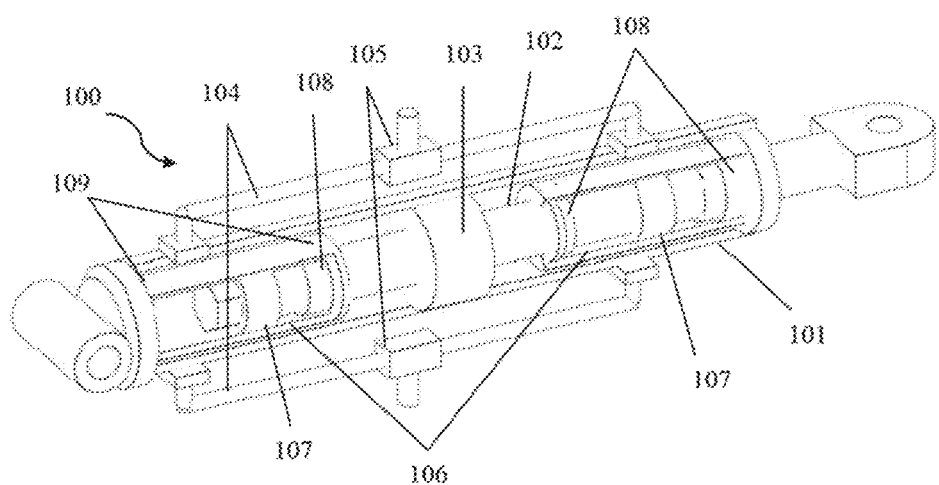
- FIG. 1 shows a multipurpose viscous damper.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting but merely as a basis for claims. It should be understood that the drawings and detailed description thereto are not intended to limit the invention to the particular form disclosed, but on the contrary, the invention is to cover all modifications, equivalents and alternatives falling within the scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the words "a" or "an" mean "at least one" and the word "plurality" means one or more, unless otherwise mentioned. Where the abbreviations or technical terms are used, these indicate the commonly accepted meanings as known in the technical field. The present invention will now be described with reference to FIGS. 1-5.

The present invention presents a multipurpose viscous damper (100), comprising:
- an outer cylinder (101);
- a core rod (102) positioned in the outer cylinder (101);
- a core piston (103) positioned in the middle and surrounded the core rod (102);
- a plurality of bypass pipes (104) extending along the outer cylinder (101), each bypass pipe (104) being connected to the outer cylinder (101) adjacent to the two ends of the outer cylinder (101);
- an orifice controller (105) located on the bypass pipes (104) for providing initial adjustable damping during low to moderate vibration; and characterized by
- a pair of inner cylinders (106) positioned inside the two ends of the core rod (102);
- an inner piston (107) positioned in each inner cylinder (106);
- a fixed sealing (108) located at the both end of each of the inner cylinders (106); and
- an orifice (109) located at the two ends of the inner cylinder (106) for allowing fluid flowing from the inner cylinder (106) to the outer cylinder (101) during movement of inner piston (107).

In a preferred embodiment of the present invention, the plurality of bypass pipes (104) can be two or more pipes. The bypass pipes allow (104) viscous fluid to flow through during movement of the core piston (103) caused by the vibrations.

According to the present invention, the pair of inner cylinders (106) positioned in both end of core rod (102) inside the cylinder (101) wherein the inner cylinders (106) are moveable caused by the vibration and stoppable by the fixed sealing (108) at the end of the cylinder (101). There is a gap between inner cylinder (106) and outer cylinder (101) to allow flowing of the fluid inside the cylinder (101) during movement of core piston (103).

In a preferred embodiment, the two orifices (109) on both end of inner cylinder (106) allow flowing of fluid inside of inner cylinder (106) to outer cylinder (101) during movement of inner piston (107) to make secondary extreme damping during severe vibration to prevent the excessive displacement.

In a preferred embodiment, the low and moderate vibrations cause the movement of the core piston (103) and the viscous fluid flow through the bypass pipe (104), orifice controller (105) reduce the velocity of fluid and increase the drop pressure which leads to damp the vibration and dissipate movement. However, said viscous damper (100) provides enough flexibility for the bridge or structure to vibrate within allowable range of displacement to dissipate a part of dynamic load and make free movement for expansion and contraction of bridge span.

In a preferred embodiment, the severe vibrations cause the span moves toward the bridge pier, cause movement of the core rod (102) inside the outer cylinder (101). The inner cylinders (106) receive pressure due to the movement of the core rod (102), whereby the inner piston (107) is started to move and push the viscous fluid to flow through orifices (109). The high speed flowing of the viscous fluid could produce great drop pressure and viscosity damping force. Then, said flow pressure will go as much as it can lead to the bypass pipes (104) and orifice controller (105) control the flow and create the huge damping to prevent the unseating of the bridge. Said process is continuous until it controls the movement with highest pressure ability.

In a preferred embodiment, a catastrophic vibration is causing span move and causes bridge unseating or excessive movement of structure whereby core piston (103) moves to the end of the outer cylinder (101). The inner cylinder (106) is stopped by end of outer cylinder (101) and the inner piston (107) moves causing flowing of the viscous fluid through orifice (109) which causes high damping and resistant force and prevent bridge span unseating or preventing excessive displacement of structure.

In a preferred embodiment, the viscous damper (100) is not limited to be used for bridge only but can be used for structure, vehicle, machine and et cetera.

Below is the example of the viscous damper (100) for preventing unseating, from which the advantages of the present invention may be more readily understood. It is to be understood that the following examples are for illustrative purpose only and should not be construed to limit the present invention in any way.

Example

Figure 2:
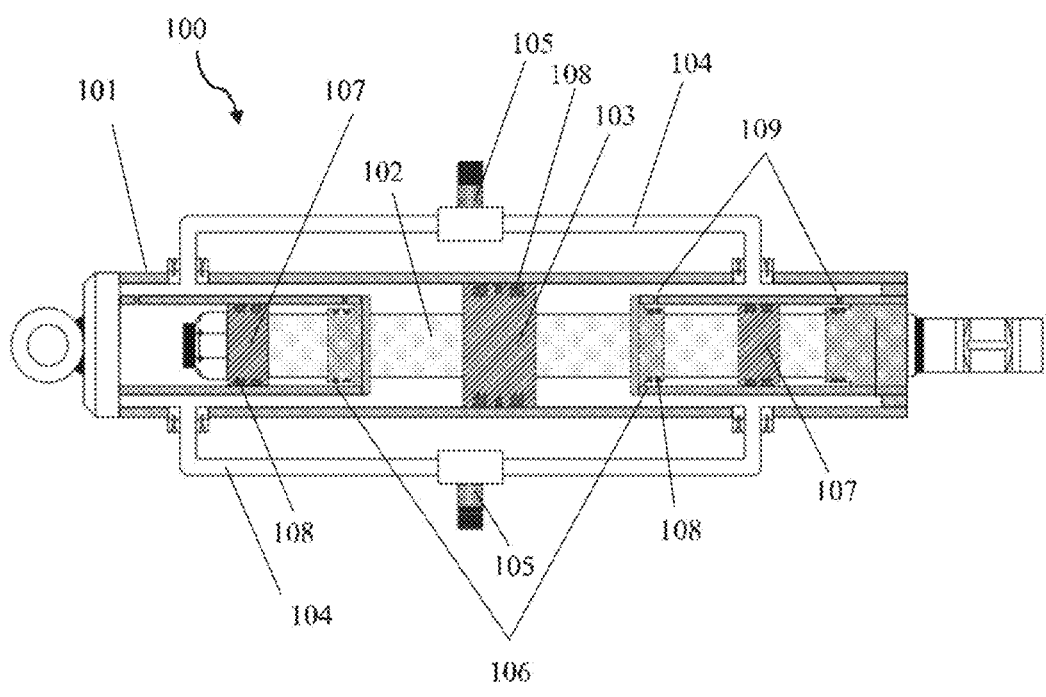
FIG. 2 shows a side view of the multipurpose viscous damper in FIG. 1.
Figure 3:
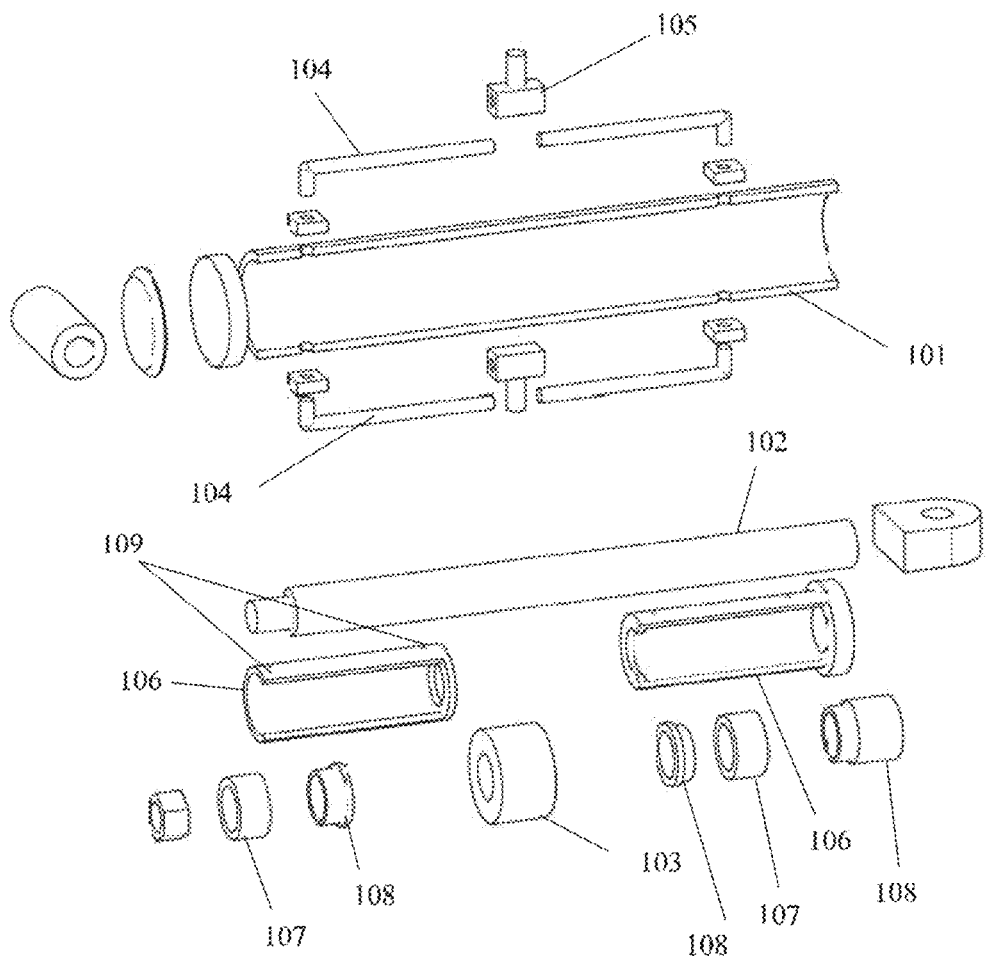
FIG. 3 shows an exploded view of the multipurpose viscous damper in FIG. 1.

A viscous damper (100) for preventing unseating was developed and shown in FIG. 1-3. Referring to FIG. 1-3, the viscous damper (100) comprises an outer cylinder (101) with attached core piston (103) on a core rod (102), two inner cylinders (106) with inner pistons (107) and fixed sealing (108), bypass pipes (104), orifices (109) and orifices controller (105).

Figure 4:
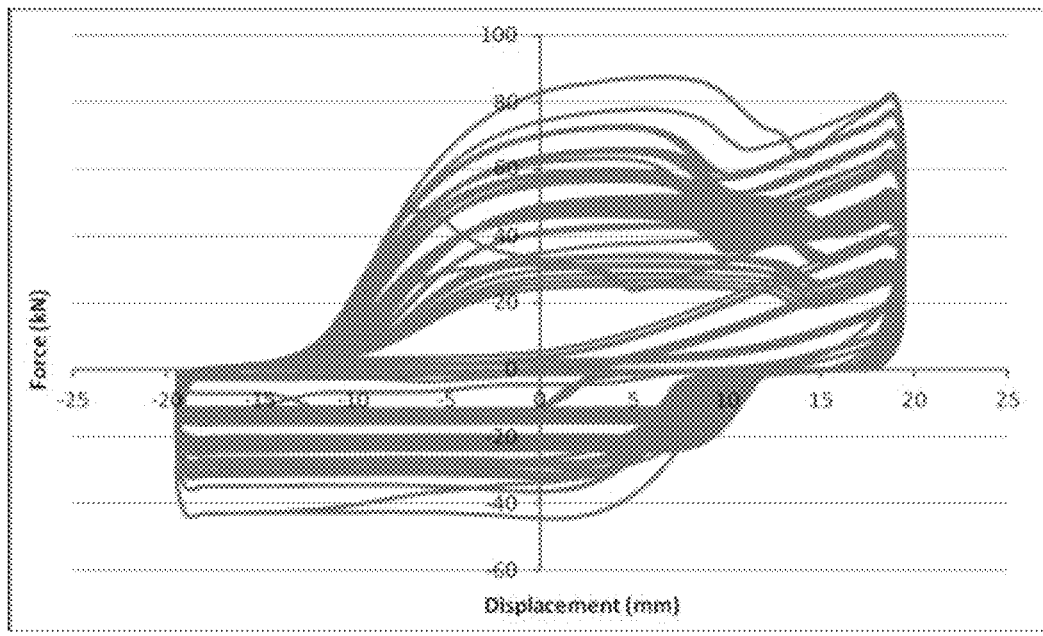
FIG. 4 shows a graph of force with displacement in 1,000 cycles.
Figure 5:
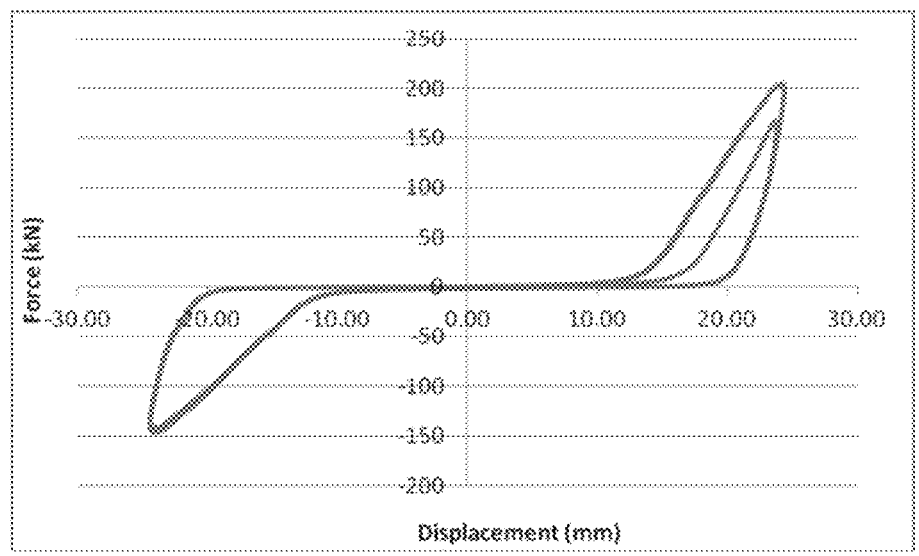
FIG. 5 shows a graph of force with excessive displacement.

FIG. 4 shows the force up to 100 kN with allowable displacement of ±20 mm in 1,000 cycles. Referring to FIG. 4, the displacements for the maximum force up to 100 kN are within ±20 mm. Also, FIG. 5 shows the functioning of device during excessive movement with more than 20 mm by increasing the resistant force up to 200 kN. The maximum load capacity is based on the outer cylinder (101) design and adjustable for any forces. Said viscous damper (100) can be designed for much higher range of force and pressure capacity.

Although the present invention has been described with reference to specific embodiments, also shown in the appended figures, it will be apparent for those skilled in the art that many variations and modifications can be done within the scope of the invention as described in the specification and defined in the following claims. Description of the reference numerals used in the accompanying drawings according to the present invention:

| Reference Numerals | Description |
| --- | --- |
| 100 | Viscous damper |
| 101 | Outer cylinder |
| 102 | Core rod |
| 103 | Core piston |
| 104 | Bypass pipe |
| 105 | Orifice controller |
| 106 | Inner cylinders |
| 107 | Inner piston |
| 108 | Fixed sealing |
| 109 | Orifices |

The invention claimed is:

1. A multipurpose viscous damper (100), comprising:
an outer cylinder (101);
a core rod (102) positioned in the outer cylinder (101);
a core piston (103) positioned at a middle of the core rod and surrounding the core rod (102);
a plurality of bypass pipes (104) extending along the outer cylinder (101), each bypass pipe (104) being connected to the outer cylinder (101) adjacent to two ends of the outer cylinder (101);
an orifice controller (105) located on each of the bypass pipes (104) for providing initial adjustable damping during low to moderate vibration; and
characterized by
a pair of inner cylinders (106) positioned inside the outer cylinder (101), wherein two ends of the core rod (102) are respectively positioned inside the inner cylinders;
an inner piston (107) positioned in each inner cylinder (106);
a fixed sealing (108) located at both ends of each of the inner cylinders (106); and
an orifice (109) located at the two ends of each of the inner cylinders (106) for allowing fluid flowing from the inner cylinders (106) to the outer cylinder (101) during movement of inner piston (107).

\* \* \* \* \*